(No Model.)
F. C. RUFFHEAD & E. J. SCHEER.
BICYCLE SUPPORT.
No. 555,024. Patented Feb. 18, 1896.
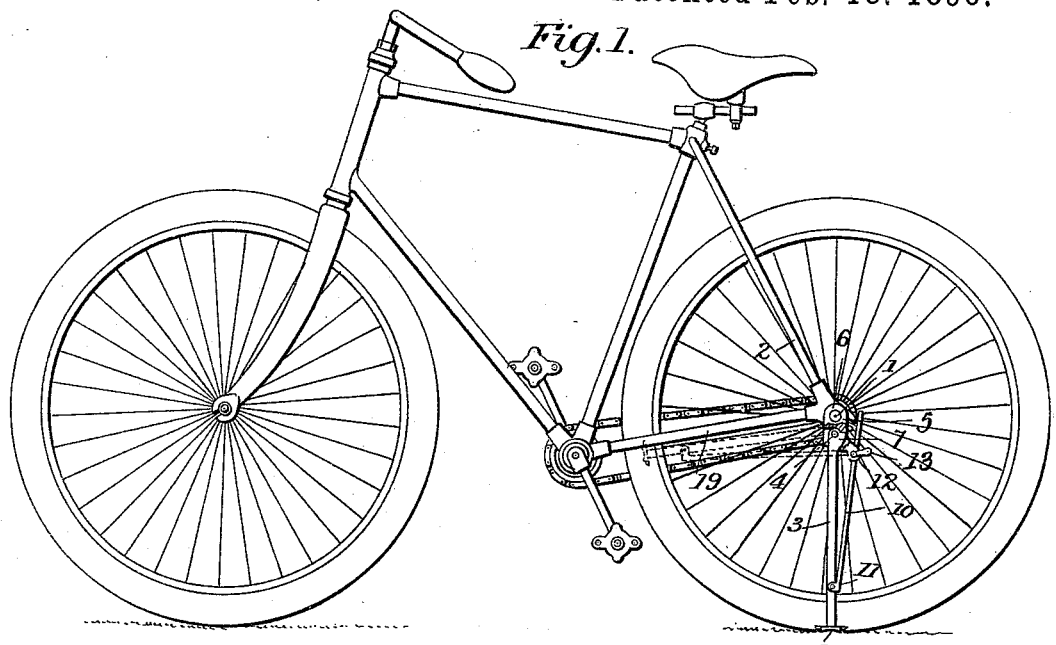
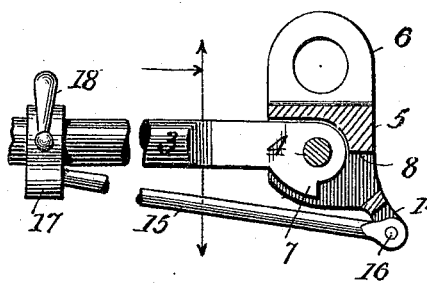
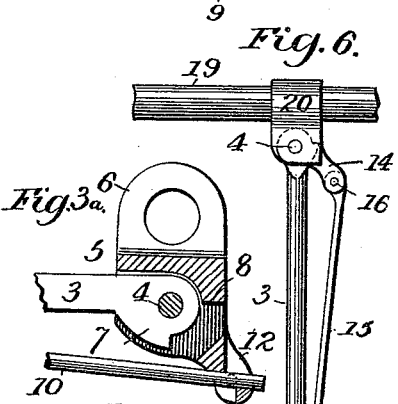
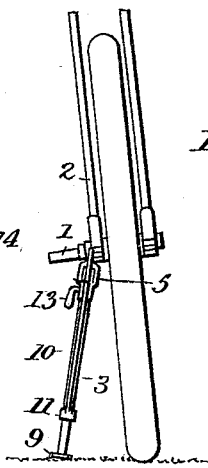
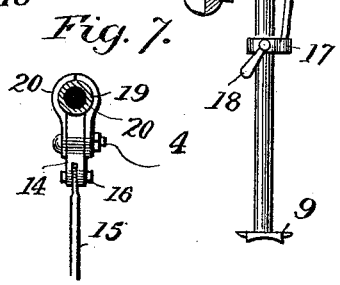
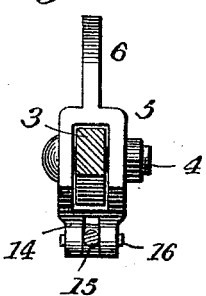
Witnesses
Jno. G. Hinkel
William E. Neff
Inventors
Fred C. Ruffhead
Emil J. Scheer
By J. H. Watson Attorney

UNITED STATES PATENT OFFICE.

FRED C. RUFFHEAD AND EMIL J. SCHEER, OF ROCHESTER, NEW YORK.

BICYCLE-SUPPORT.

SPECIFICATION forming part of Letters Patent No. 555,024, dated February 18, 1896.

Application filed August 27, 1895. Serial No. 560,670. (No model.)

*To all whom it may concern:*

Be it known that we, FRED C. RUFFHEAD and EMIL J. SCHEER, citizens of the United States, residing at Rochester, in the county of Monroe and State of New York, have invented certain new and useful Improvements in Bicycle-Supports, of which the following is a specification.

The object of our invention is to produce a simple and cheap device for temporarily supporting a bicycle when it is desired to leave it standing.

A further object is to produce a support which is light and can be easily attached to or detached from bicycles of ordinary construction.

The invention consists of three principal parts, which we will call the supporting-rod proper, the bracket to which the rod is pivoted, and the brace-rod which holds the supporting-rod in any desired adjustment in the plane of its movement. The supporting-rod and the brace form two sides of a triangle and a portion of the bracket forms the third side. The brace is adjustable and we provide a clamp which will hold it firmly after adjustment.

In one form of our invention the brace is adjustable in the bracket, while in another form one end of the brace is pivoted in the bracket and the other end is adjustable upon the supporting-rod and provided with a clamp.

It is a noticeable fact at park gatherings, picnics, bicycle and other races, and other outdoor resorts that adequate means are not provided for the proper care of bicycles when not in use, and riders must either take their wheels with them and suffer much inconvenience or be compelled to leave the wheels lying on the ground or stacked together, in either case running great risk of injury to the wheels by their liability to fall over, or their being run over by careless persons or by heavier vehicles. Besides this great risk of injury at resorts there is much unavoidable rough usage of wheels in cities while riders are performing their regular daily duties by being compelled to lean their bicycles against brick or stone walls and other rough objects, and thereby scrape and wear the saddles, handles and frames of the machines, and in addition to the above there is the still more dangerous alternative of resting bicycles against curbstones, which so frequently results in the wheel falling over and being injured or broken by striking the hard walks or pavements, simply because the wheel is too top-heavy when left in this position. Our invention is intended to obviate these difficulties and it is well arranged with that end in view, being preferably fastened to the hub of the rear wheel, which is about the only rigid or fixed part of a bicycle to fasten a rest to, while our support is attached high enough and is given sufficient angle to amply hold up a wheel under quite a heavy strain. Besides these features this support is always present, easily operated, is simple and light, out of the way when not in use, and can be used without injury to the machine.

In the accompanying drawings, in which like reference-signs refer to similar parts throughout the several views, Figure 1 is a side view of a bicycle provided with our improved support, a portion of the bracket being broken away. Fig. 2 is a rear view of the rear wheel and the support. Fig. 3 is an enlarged rear view of the bracket. Fig. 3$^a$ is an enlarged side view, partly in section, of the bracket shown in Figs. 1 to 3, inclusive. Fig. 4 is a similar view of a different form of support. Fig. 5 is a rear view of the parts shown in Fig 4. Fig. 6 is a side view of another form of bracket; and Fig. 7 is a rear view of the same, the supporting-rod and brace being broken away.

We have illustrated the invention in three forms.

In the first form, which is shown in Figs. 1, 2, 3 and 3$^a$, 1 indicates the rear axle of a bicycle and 2 the rear portion of the frame, in which the axle is mounted. The support proper, 3, is pivoted at 4 to a bracket 5, which has a thin shank 6 provided with a hole through which the axle 1 passes. The bracket is held in place by means of the usual nut which fits on the end of the axle and clamps the latter to the frame. The body of the bracket 5 is preferably bent at a slight angle to the shank 6, so as to throw the foot of the support away from the base of the bicycle and permit of the latter being leaned upon the support, as shown in Fig. 2. The support 3 may be either solid or tubular. At the upper end it is preferably provided with a shoulder 7, which abuts against a shoulder 8 on the bracket when the support is dropped, thus preventing it from swinging back beyond a vertical position. The lower or free end of the support is provided with a foot 9 of any suitable construction.

In order to hold the support firmly, either in a vertical position when in use or in its raised position, which is preferably parallel with and under one of the side rods of the frame, as shown in dotted lines in Fig. 1, we provide a brace-rod 10 and suitable means for holding the same in its different adjustments. The brace-rod is preferably connected with the lower part of the supporting-rod, as at 11, and it passes through a loop 12, which is preferably integral with the bracket 5. The loop has a flaring hole through which the brace passes, the smaller end of the hole being toward the front, and from which point it flares toward the rear to permit of the angular movement of the brace. A clamping-screw 13 turns in the outer wall of the loop 5 and is adapted to clamp the brace-rod in any desired position. In Figs. 1 and 2 the support is shown in its lower or operative position in full lines, and in Fig. 1 it is shown raised in dotted lines. The joint 11 may be pivoted or it may be more or less rigid, as the relative movement of the supporting-rod and the brace is very slight.

It will be evident that the brace when turned down and clamped really forms an auxiliary supporting-rod, and the rod and brace may therefore be made very light.

In Figs. 4 and 5 is shown a form of invention in which the bracket 5 is similar to that shown in the other figures, excepting that in place of the loop 12 there is a small yoke 14, in which the brace-rod 15 is pivoted upon a pin 16. The free end of the brace is connected to a sliding collar or yoke 17, which embraces the supporting-rod 3. A clamping-screw 18 mounted in the collar 17 permits the collar to be clamped at any point along the support. It will be evident that in this form of the invention the supporting-rod may be kept in the vertical or horizontal position, or in any desired intermediate position, by simply adjusting it to the desired position and then fastening it with the clamping-screw 18.

In Figs. 6 and 7 the supporting-rod, the brace, and the means for pivoting them and clamping them together are the same as in Figs. 4 and 5. The bracket, however, is different and is adapted to be clamped to one of the rods or tubes of the frame, preferably the left-side rod 19, which runs from the crank-shaft to the rear axle. The bracket 5 instead of having a shank 6 is embraced by two clamping-arms 20, which embrace the side rod of the frame and are clamped tightly thereon by means of the bolt or screw 4. The clamping-arms 20 may be connected to the side rod 19 at either end—that is, near the crank-shaft or near the rear axle, as may be most desired.

The normal condition of the bicycle-support when the wheel is in use is that shown dotted in Fig. 1, wherein the support is parallel with and directly under the side rod 19, the support being held in this position by the brace. When it is desired to leave the wheel standing, the brace-clamp is loosened and the support is dropped to the vertical position, in which it may be held by again clamping the brace.

Having described the invention, what we claim, and desire to secure by Letters Patent, is—

1. In a bicycle-support, the combination with a bracket and means for attaching the same to the frame of a bicycle, of a supporting-rod pivoted to one part of the bracket, and a brace extending from a different part of the bracket to the body of the supporting-rod and connected with said bracket and supporting-rod, one of said connections being a sliding connection and provided with a clamping-screw, whereby the supporting-rod may be clamped in any desired adjustment, substantially as described.

2. In a bicycle-support, the combination with the bracket having a flat perforated shank and means for clamping said shank upon the rear axle of a bicycle, of a supporting-rod pivoted in one part of the bracket and adapted to be moved to either a horizontal or vertical position, and a brace-rod extending from a different part of the bracket to the body of the supporting-rod and connected with said bracket and supporting-rod, one of said connections being a sliding connection and provided with a clamping-screw, whereby the supporting-rod may be clamped in any desired adjustment, substantially as described.

3. In a bicycle-support, the combination with the bracket and means for clamping the same to a bicycle-frame, of a supporting-rod pivoted in the bracket, a loop upon the lower rear portion of the bracket provided with an opening, a brace-rod having one end connected with the supporting-rod and the other end passing through the opening of the loop, and a clamping-screw arranged to clamp said brace in the loop, substantially as described.

4. In a bicycle-support, the combination with the bracket having a flat perforated shank and means for clamping the same upon the rear axle of the machine, of a supporting-rod pivoted in the bracket, a loop upon the lower rear portion of the bracket provided with an opening, a brace-rod having one end connected with the supporting-rod and the other end passing through the opening of the loop, and a clamping-screw arranged to clamp said brace in the loop, substantially as described.

In testimony whereof we affix our signatures in presence of two witnesses.

FRED C. RUFFHEAD.
    EMIL J. SCHEER.

Witnesses:
 EDWARD WEBSTER,
 ROY C. WEBSTER.